(12) United States Patent
Ikeda et al.

(10) Patent No.: US 7,586,766 B2
(45) Date of Patent: Sep. 8, 2009

(54) PLASMA ARC POWER SUPPLY AND CONTROL METHOD FOR SAME

(75) Inventors: Tetsuro Ikeda, Osaka (JP); Masahiro Ohashi, Osaka (JP); Takayuki Nishisako, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 151 days.

(21) Appl. No.: 11/955,151

(22) Filed: Dec. 12, 2007

(65) Prior Publication Data

US 2008/0143261 A1    Jun. 19, 2008

(30) Foreign Application Priority Data

Dec. 15, 2006   (JP)   ............................. 2006-338421

(51) Int. Cl.
*H02M 7/00*    (2006.01)

(52) U.S. Cl. ............................. 363/65; 363/71; 363/74; 363/98; 363/142

(58) Field of Classification Search .................. 363/65, 363/56.01, 75, 71, 78, 95, 97, 98, 142
See application file for complete search history.

(56) References Cited

U.S. PATENT DOCUMENTS

| 3,729,671 A * | 4/1973 | Jeffery et al. | .................. 363/50 |
| 6,954,365 B2 * | 10/2005 | Deguchi | ....................... 363/65 |

FOREIGN PATENT DOCUMENTS

| JP | H06-190562 A | 7/1994 |
| JP | H08-001350 A | 1/1996 |

* cited by examiner

*Primary Examiner*—Tuyet Vo
(74) *Attorney, Agent, or Firm*—Global IP Counselors, LLP (57) ABSTRACT

Energy loss due to driving a plurality of power supply units simultaneously in a low-current region is prevented, and a more stable load current is obtained. The generation of a load current in a small-current region from a pilot arc current is handled solely by the power supply unit U1, the remaining (N−1) power supply units U2 through U4 are driven when the small-current region is exceeded, and a current that is the composite of all the currents is fed to the load, whereby a stable plasma arc power supply is obtained in which power consumption in the low-current region is reduced.

19 Claims, 6 Drawing Sheets

PLASMA ARC POWER SUPPLY AND CONTROL METHOD FOR SAME

BACKGROUND OF THE INVENTION

1. Field of the Invention

The present invention relates to a plasma arc power supply of a welding machine or a cutting machine that uses a plurality of power supply units, and to a control method for the plasma arc power supply.

2. Description of the Related Art

An inverter plasma arc power supply is well known conventionally as a plasma arc power supply used in welding machines or cutting machines. The capacity of welding machines or cutting machines is adjusted from a small-current region to a large-current region for use according to the application.

Japanese Laid-open Patent Application No. 8-1350 (Parallel System of Inverter Resistance Welding Machine) discloses a technique connecting each of multiple inverter resistance welding machines having the same configuration via a welding transformer for each inverter, forming a direct parallel connection to the secondary side of the welding transformer, and enabling increased capacity in a power supply through the use of a synchronization signal and a communication means. A plurality of power supply units composed of inverters having a standard capacity is connected in parallel to form a power supply apparatus, and the inverters are activated in synchrony by a synchronization signal created from the zero crossing of an alternating-current power supply. The capacity can therefore be easily increased and reduced, and replacement can be performed in a short time in the event of failure.

The energy P of welding or cutting can be calculated as the product of the inductance value L and the square of the current I ($P = (1/2) \times L \times I \times I$). When the power supply units are activated in synchrony as described in Japanese Laid-open Patent Application No. 8-1350, the output of the current is distributed among the power supply units, and the energy P when the number of power supply units is 4, for example, is $P = 4 \times \{(1/2) \times L \times (I/4) \times (I/4)\}$. Accordingly, the overall $P = (1/8) \times L \times I \times I$, and the energy P is one-fourth the energy obtained when a single power source is used. Such a loss in energy P creates poor efficiency in a small-current region in which only a low energy is originally needed. When four power supply units are used, the current of each power supply unit must be multiplied by four, or a complex calculation must be performed to vary the inductance L in each case in order to obtain the same energy obtained when a single power supply is used. In the invention disclosed in Japanese Laid-open Patent Application No. 8-1350, since all of the power supply units are driven at the same time, an unstable state at the time of plasma arc generation, as well as wandering of the current, are added to the plurality of power supply units. Drawbacks therefore occur in that the outputted load current becomes more unstable, and the load current takes time to be stabilized.

The present inventors therefore developed the invention described in Japanese Laid-open Patent Application No. 6-190562 (Power Supply for Plasma Arc) prior to Japanese Laid-open Patent Application No. 8-1350. Japanese Laid-open Patent Application No. 6-190562 discloses a power supply provided with N direct-current power supply devices in which the direct-current power supply devices are operated in parallel after only a prescribed direct-current power supply device is operated to supply a pilot arc current to a load. The power supply includes an integrator for generating an integrated signal and an inverted signal thereof from a signal from a parallel operation command terminal to which a parallel operation command signal is fed, a first multiplier for multiplying a reference signal and an inverted signal of a charge fed to the load, an attenuator for attenuating the reference signal to 1/N, a second multiplier for multiplying the integrated signal by the output signal of the attenuator, and an addition unit for adding the output signals of the first multiplier and the second multiplier, wherein the output setting signals of the remaining direct-current power supply devices are formed by a prescribed direct-current power supply device according to the output signal of the addition unit. Through this configuration, a prescribed direct-current power supply device is first operated independently to generate a pilot arc, the prescribed direct-current power supply device is then smoothly reduced to a current value that corresponds to 1/N of the reference power supply, and the other direct-current power supply devices can be smoothly increased to the current value that corresponds to 1/N of the reference power supply and promptly transferred to parallel operation, whereby the power feed during arc startup is stabilized. According to the invention disclosed in Japanese Laid-open Patent Application No. 6-190562, all of the operational effects disclosed in Japanese Laid-open Patent Application No. 8-1350 can be achieved, and stability during arc startup can also be obtained as an effect.

Figure 5:
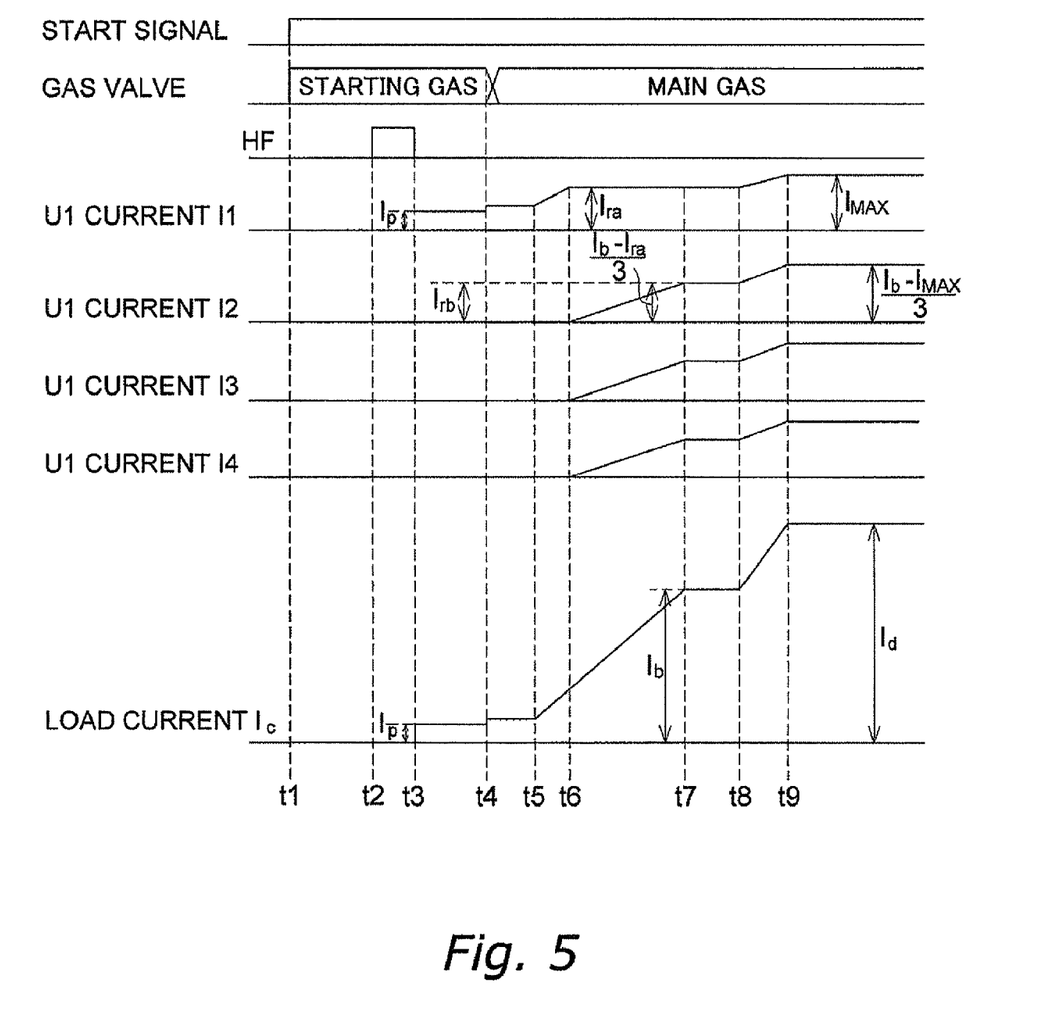
FIG. 5 is a timing chart showing the control operations of Embodiment 2.
Figure 6:
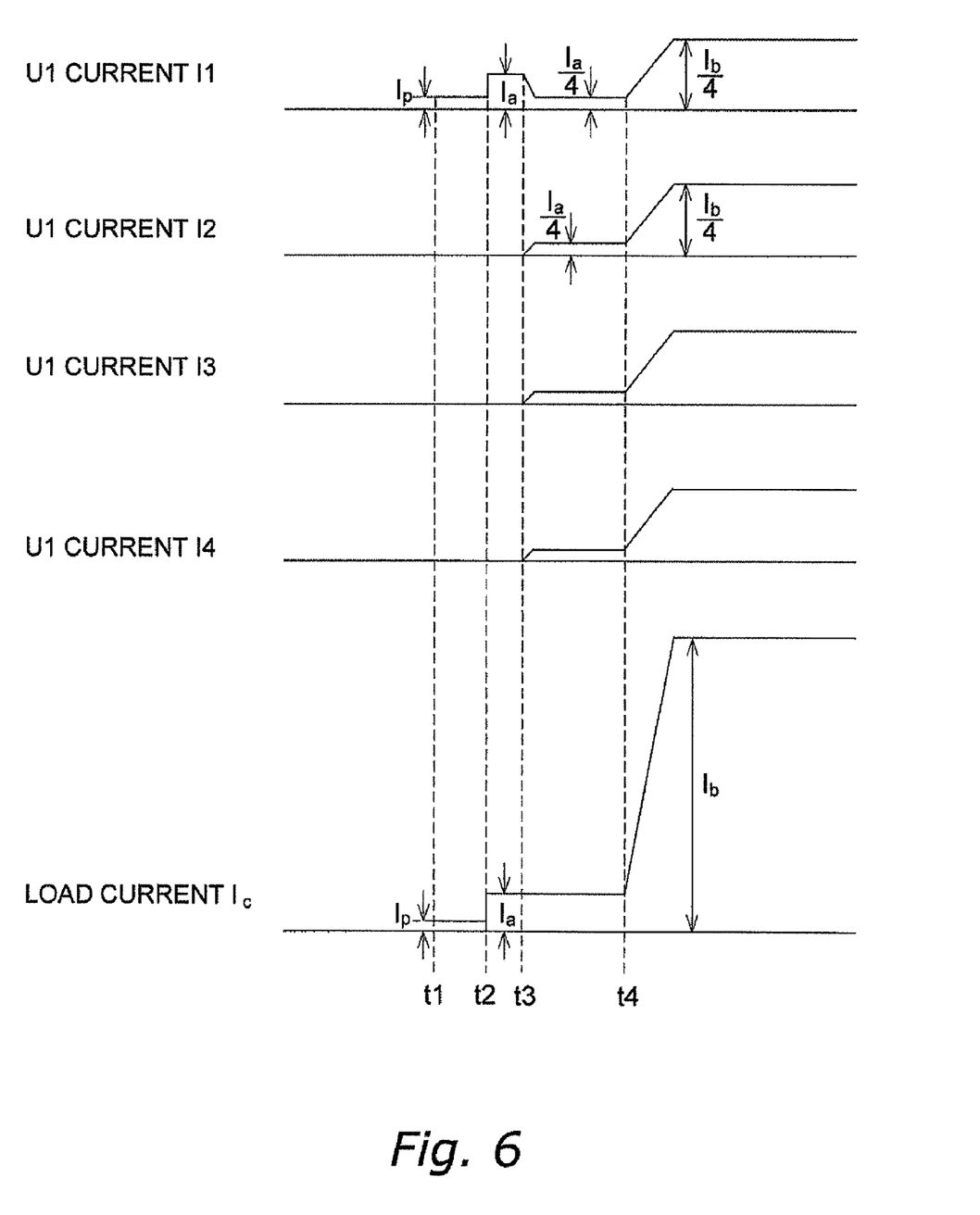
FIG. 6 is a timing chart of the conventional power supply unit.

The control timing of the current of the direct-current power supply device according to Japanese Laid-open Patent Application No. 6-190562 will be described using FIG. 5. In FIG. 5, N is 4, the prescribed direct-current power supply device is the power supply unit U1, and the (N−1) direct-current power supply devices are the three power supply units U2, U3, U4. When $I_C$ is obtained as the load current, a pilot arc current $I_P$ is conducted to the electrode by the power supply unit U1 at t1 to initiate the pilot arc, the torch is brought near the workpiece to generate a plasma arc current $I_a$. The plasma arc current $I_a$ is detected, whereby the power supply unit U1 is shift to the main arc state, and the power supply units U2, U3, U4 are driven at the same time. The arc current of the power supply unit U1 is controlled so as to decrease gradually to $I_a/4$, and the arc currents of each of the power supply units U2, U3, U4 are controlled so as to gradually increase to $I_a/4$. A stable load current $I_a$ is obtained by adding all of the currents obtained in this manner, so that welding or cutting is performed. When the power supply is then adjusted to change the load current to $I_b$, the arc currents of all the power supply units U1 through U4 can be increased to $I_b/4$ and added to obtain the load current $I_b$.

However, the invention disclosed in Japanese Laid-open Patent Application No. 6-190562 also has drawbacks in that parallel driving brings the energy to 1/N, particularly in the small-current region. When an extremely thin metal plate is welded or cut as the workpiece, or when only a small current is needed, such as when, for example, etching letters or symbols using the low current region on a workpiece, all of the direct-current power supply devices are used, and work therefore cannot be performed at a power savings, and energy is wasted.

When, for example, a current of 100 A is needed as the plasma arc current $I_a$, the current handled by the four power supply units is 25 A each, and all of the power supply units are driven in order to obtain a current similar to the pilot current. When all of the power supply units abruptly increase and decrease due to the effects of noise or the like in such a small-current region, the fluctuations of all the power supply units are added together, and the effects of noise and the like are increased by a factor of four. The effect is small when a large current is fed, but the temperature of the torch rapidly increases when there is significant fluctuation in the current value in the small-current region, and there is a risk of electrode deformation or interruption of the arc. When the inductance is L, the energy P is 5000×L in one power supply unit, whereas the energy P is reduced to 1250×L by the driving of four power supply units. It has been suggested that this drawback could be overcome by varying the inductance L in order to obtain a certain degree of energy according to the application, but there is no longer the merit of using multiple power supply units whereby the variable range of the inductance is reduced, a wide range of load currents is obtained using a simple structure, and failure response and equipment outlay are facilitated. Considering the environment, there is also a societal need to obtain energy savings with minimal waste of power using a simple configuration in the small-current region in which power consumption is considered to be naturally low.

Therefore, an object of the present invention is to reduce energy waste in the small-current region and apply a stable plasma arc power supply by controlling the drive timing of a plurality of power supply units.

SUMMARY OF THE INVENTION

The present invention, which has been developed to achieve the abovementioned objects, provides a plasma arc power supply wherein one direct-current power supply unit among N direct-current power supply units outputs a pilot arc current, only one direct-current power supply unit continuously supplies a load current in a small-current region, a relay circuit is driven so that the load current is increased to a prescribed current value only by the one direct-current power supply unit when a load current that exceeds the small-current region is specified by an output setting means; and the relay circuit outputs a relay signal so that the (N−1) direct-current power supply units are driven, and the N direct-current power supply units generate a current distributed on the basis of the current value determined by a signal distributor when the current value of the one direct-current power supply unit reaches the prescribed current value, resulting in a composite output of the N direct-current power supply units coinciding with the load current.

Specifically, the plasma arc power supply in which the present invention is applied has N direct-current power supply units, the small-current region is handled by only one direct-current power supply unit that outputs a pilot arc current, and the remaining (N−1) direct-current power supply unit are driven to generate a load current only when a load current that exceeds the small-current region is obtained. Controlling the drive timing of the direct-current power supply units in this manner makes it possible to obtain all the merits of a plasma arc power supply that uses multiple direct-current power supply units, i.e., to facilitate initial equipment outlay and to simplify failure response. A stable load current can also be obtained even in the small-current region in which the output can become unstable, and power consumption in the small-current region can also be reduced.

A soft start can also be employed in which the startup of the (N−1) direct-current power supply units is extremely gradual. Overshoot that occurs during startup of the (N−1) direct-current power supply units can therefore be prevented.

When all N direct-current power supplies are driven to obtain a load current that exceeds the small-current region, the load current can be distributed in N equal parts (in other words, the current generated by the direct-current power supply units is handled equally). In this case, the N direct-current power supply devices, the heat dissipation structure, and other aspects of the surrounding environment can be structured in the same manner.

A configuration may be adopted in which a different current value is generated by the one direct-current power supply unit for outputting the pilot arc current, and the other (N−1) direct-current power supply units. For example, a configuration may be adopted in which the current values handled by each of the (N−1) units are made greater than the current value handled by the one unit, the total current value generated by the N direct-current power supply units including the pilot arc current is evenly distributed, and the loads handled by the circuits are substantially equalized to distribute the risk of device-wide failure or the like. One direct-current power supply unit is sufficient to handle the small-current region when the small-current region is a current of 100 A or less, and there is no need to use a composite current generated by multiple direct-current power supply units. In other words, a small-current region of 100 A or less is preferred from the perspectives of power consumption, noise reduction, and other factors. Adopting a configuration in which currents of about 100 A or less are handled by a single direct-current power supply unit, and the other (N−1) direct-current power supply units are driven only to obtain larger load currents makes it possible to prevent unstable factors from being further added to the unstable state immediately after the pilot arc current is fed to generate the plasma arc, and power consumption can therefore be minimized during work that requires only a small amount of energy.

According to the present invention configured as described above, energy waste can be reduced, and stability can be increased in the small-current region in the plasma arc power supply and the control method thereof.

DETAILED DESCRIPTION OF THE INVENTION

1. Embodiment 1

Figure 1:
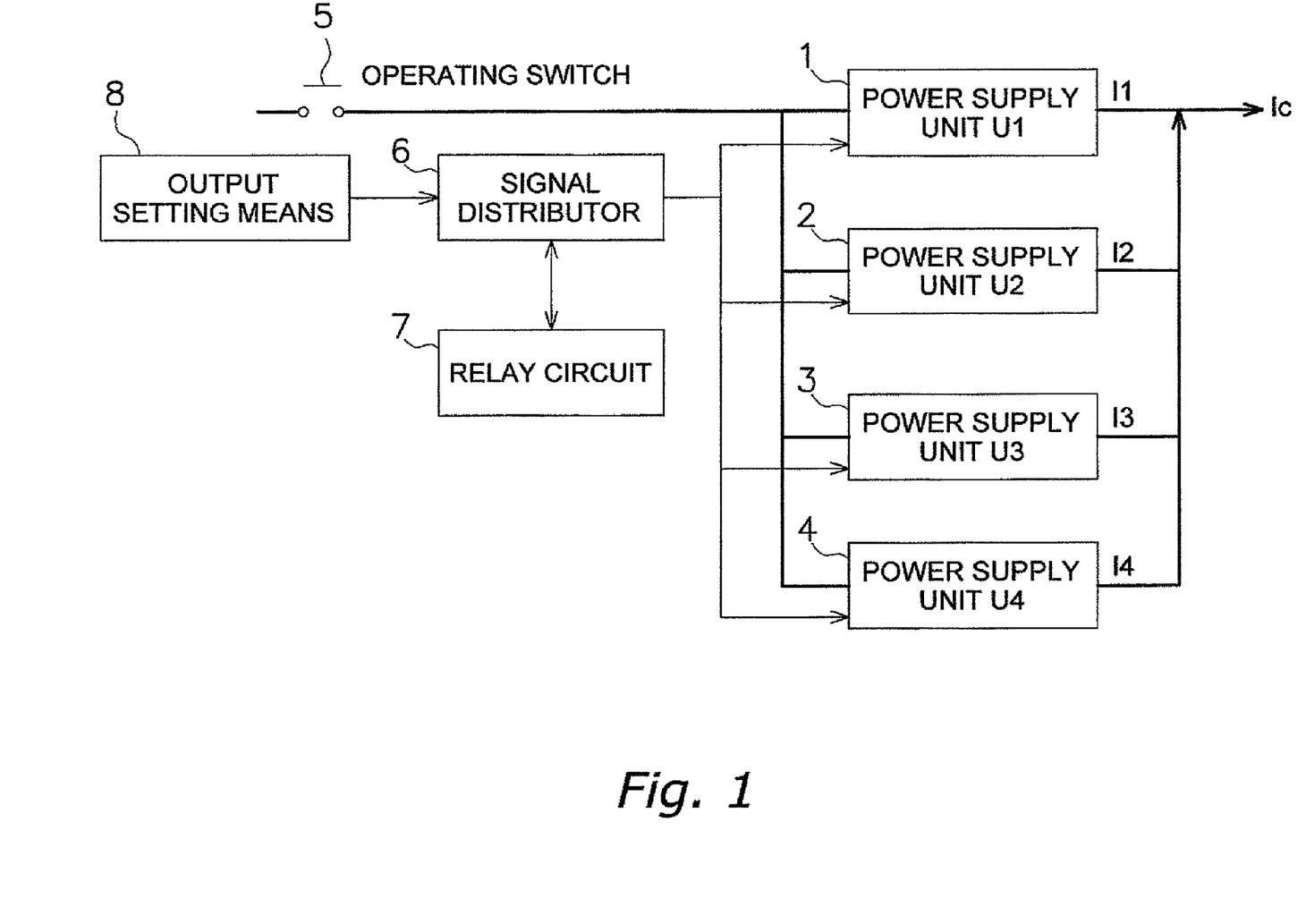
FIG. 1 is a block diagram showing the structure of Embodiment 1 of the present invention.
Figure 2:
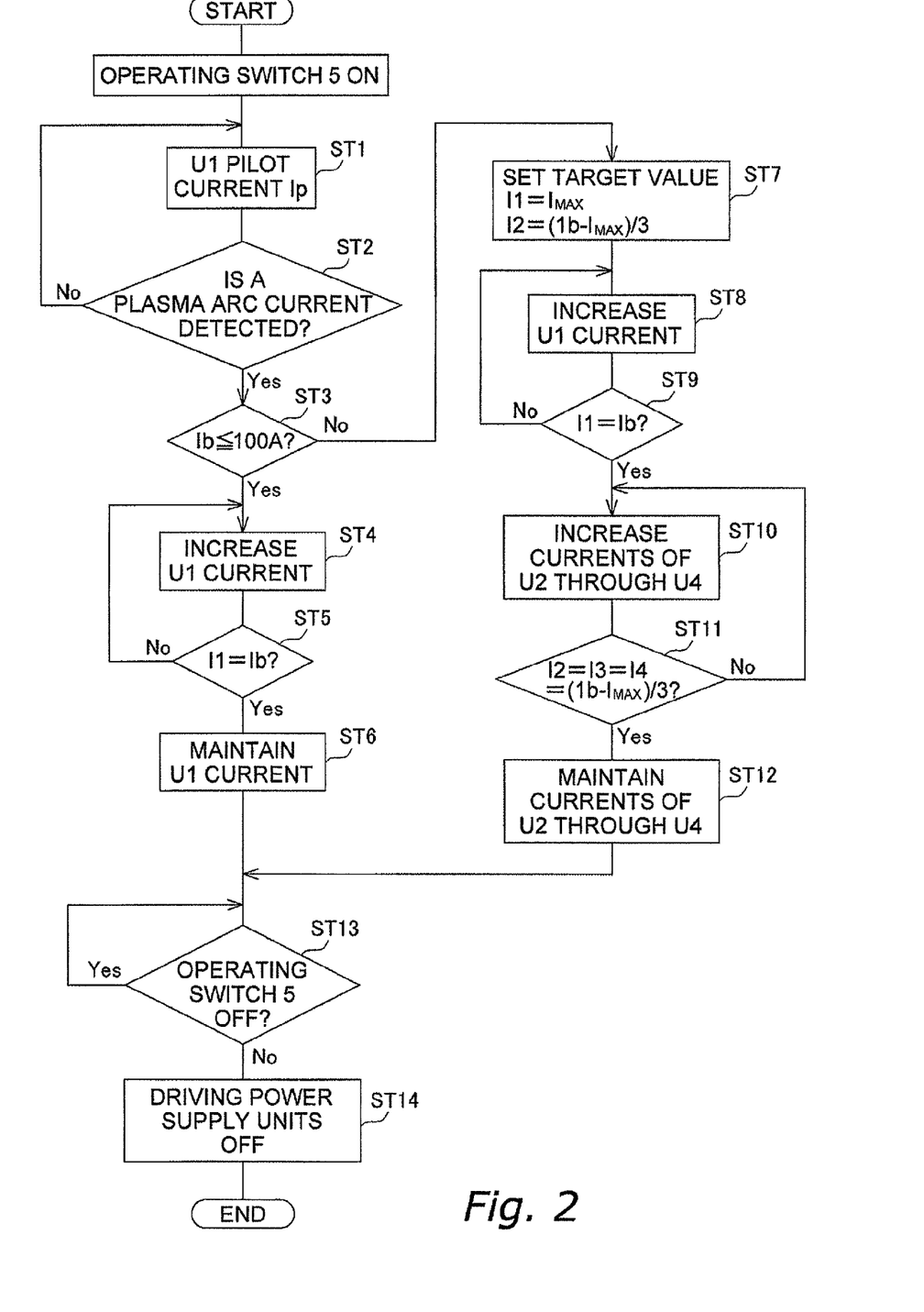
FIG. 2 is a flowchart showing the control operations of Embodiment 1 of the present invention.
Figure 3:
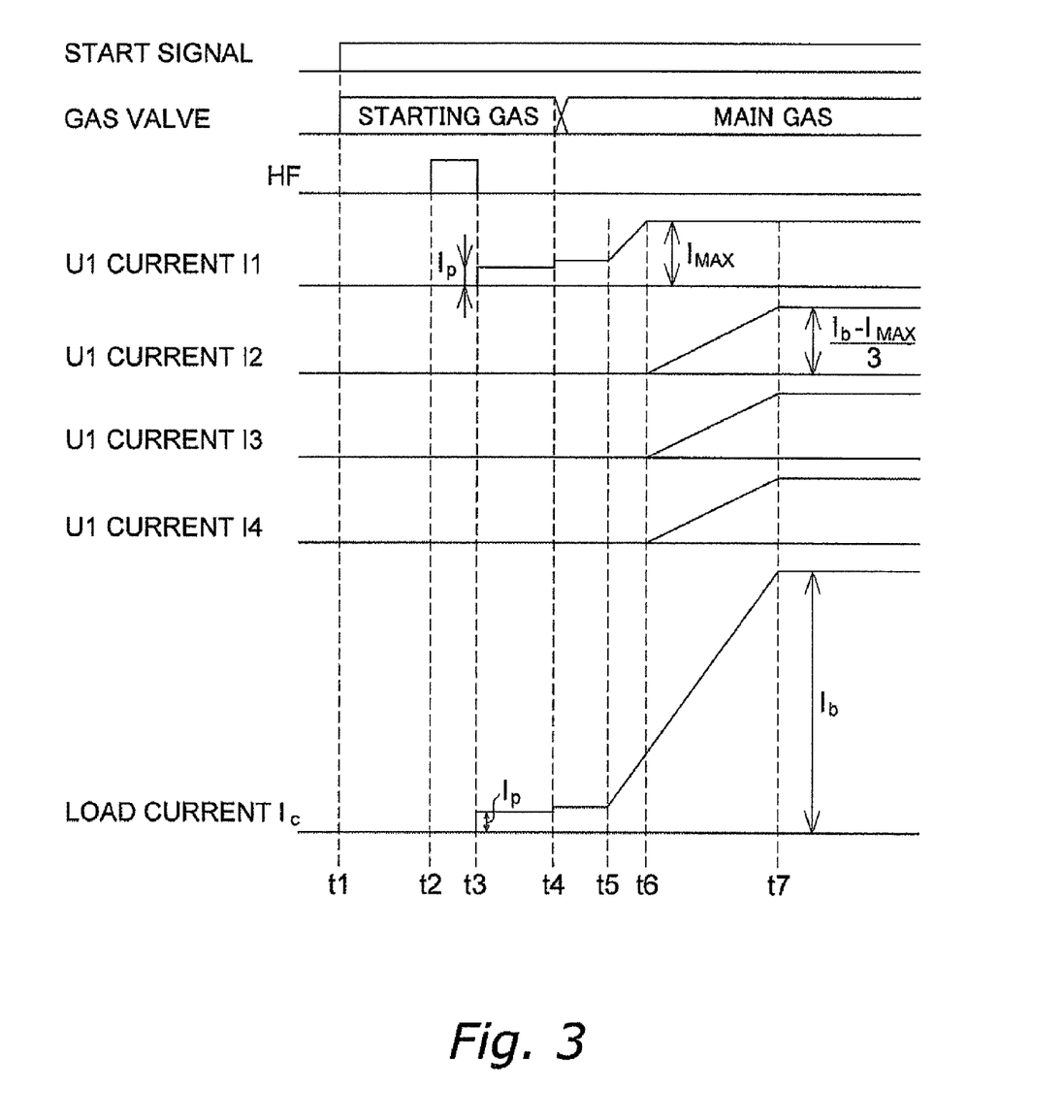
FIG. 3 is a timing chart showing the control operations of Embodiment 1 of the present invention.

Embodiment 1 of the present invention will be described using FIGS. 1 through 3. FIG. 1 is a block diagram showing Embodiment 1 of the present invention; FIG. 2 is a flowchart relating to current; and FIG. 3 is a timing chart. The diagrams show a case in which N=4.

(1) Structure of Plasma Arc Power Supply

The plasma arc power supply shown in FIG. 1 is used in a welding machine or a cutting machine.

When an operating switch 5 is turned ON, power supply units U1 through U4 having the same structure are driven in a manner in which the startup timing is controlled by a relay circuit 7 and a signal distributor 6. The output currents I1 through I4 of the power supply units U1 through U4, respectively, are each feedback-controlled by a detection device not shown in the drawing, and are controlled so as to output a specified prescribed current. The current value of the load current $I_c$ presented to the workpiece is specified by an output setting means 8, and can be varied according to the application. The value of the load current $I_b$ specified by the output setting means 8 is inputted to the relay circuit 7 via the signal distributor 6.

The signal distributor 6 drives, according to the specified value, only the power supply unit U1 as one direct-current power supply unit or drives the power supply units U2 through U4 as the (N−1) direct-current power supply units, determines whether to distribute the specified load current $I_b$ among all the power supply units U1 through U4, and feeds a signal to the relay circuit 7.

The relay circuit 7 initiates driving of the power supply unit U1, generates a relay signal for delaying the drive timing of the power supply units U2 through U4, and feeds the relay signal to the power supply units U1 through U4 via the signal distributor 6.

(2) Plasma Arc Power Supply Control Method

The method for controlling the plasma arc power supply will next be described using the flowchart in FIG. 2 and the timing chart in FIG. 3. In this case, the small-current region is 100 A or less, and the rated current of the power supply units U1 through U4 is 100 A, for example.

(Start to ST3)

The operations from start to ST3 in the flowchart of FIG. 2 will first be described.

When the operating switch 5 is turned on and the start signal is outputted at t1, a starting plasma gas for starting the arc is fed from a gas valve not shown in the drawing. A high frequency HF is generated after a specific time period t2, the power supply unit U1 is driven at t3, and a pilot arc is generated when the pilot current $I_p$ is generated (ST1). The torch is then brought near the workpiece as the load, whereby a plasma arc current is generated between the main electrode and the load at t4 (ST2). When the plasma arc current is detected at t4, the gas valve is opened and closed to initiate a gas exchange from the starting plasma gas to a main gas for shielding that is used during generation of the main arc. When the output current I1 of the power supply unit U1 is stabilized, the transition to the main arc begins at t5.

The value of the load current $I_b$ specified by the output setting means 8 is inputted to the signal distributor 6, the signal distributor 6 determines whether or not the specified load current $I_b$ is 100 A or less (ST3), and the determination result is outputted to the relay circuit 7.

(ST4 through ST6)

The operations in ST4 through ST6 in the flowchart of FIG. 2 will next be described. The change in the current value in this case is not shown in FIG. 3.

When the specified load current $I_b$ is 100 A or less, the relay circuit 7 feeds a relay signal to the power supply unit U1 via the signal distributor 6, and after the current stabilizes, increasing of the current is initiated at t5 (ST4), and increasing of the current is completed when the current I1 of the power supply unit U1 reaches the specified load current $I_b$ (ST5). The current of the power supply unit U1 is then maintained at $I_b$ (ST6). The remaining power supply units U2 through U4 are in a standby state at this time (the power supply units U2 through U4 are not supplying current). In other words, when the load current $I_b$ is 100 A or less, only the power supply unit U1 feeds a current, and the current is the load current.

(ST7 through ST12)

The operations of ST7 through ST12 in the flowchart of FIG. 2 will next be described. The change in the current value in this case is shown in the right-side portion of FIG. 3.

When the specified load current $I_b$ exceeds 100 A, the relay circuit 7 generates a relay signal for delaying the driving of the power supply units U2 through U4, and feeds the timing of initiating an increase in current to the power supply units U1 and U2 via the signal distributor 6. The signal distributor 6 feeds a target value obtained by distributing the specified load current $I_b$ to the power supply units U1 through U4 (ST7). Specifically, the target value of the current I1 of the power supply unit U1 is the rated current $I_{MAX}$, and the target value of the currents I2 through I4 of the power supply units U2 through U4 is $(I_b-I_{MAX})/3$. In response to the relay signal from the relay circuit 7, the current of the power supply unit 1 begins to increase at t5 in the same manner described above after the current stabilizes (ST8), and the power supply units U2 through U4 are driven to increase the currents I2 through I4 (ST10) at the timing t6 at which the current of the power supply unit U1 reaches the rated current of 100 A (=$I_{MAX}$) (ST9). At this time, the currents distributed to the direct-current power supply units U2 through U4 are gradually increased. When the current increases to $(I_b-I_{MAX})/3$ (ST11), the current is then maintained (ST12). All of the power supply units U1 through U4 reach the rated current at t7, and a load current $I_b$ of 400 A can be obtained in the present example.

As shown in FIG. 3, the load current is the same as the current I1 generated by the power supply unit U1 in the small current region of 100 A or less, for example, from t3 to t5, and after t5, the composite current $I_b$ of the currents I1 through I4 generated by the power supply units U1 through U4 is I1+I2+I3+I4.

(ST13 to End)

The operations in ST13 to the end in the flowchart of FIG. 2 will next be described. When the operating switch 5 is turned off during feeding of the load current (ST13), the power supply unit U1 is turned off if only the power supply unit U1 was being driven (ST3 through ST6), and all of the power supply units U1 through U4 are turned off (ST14) if the power supply units U1 through U4 were being driven (ST7 through ST12), and the control operations are completed.

In the present embodiment, power supply units U1 through U4 having the same structure are used, and the design or electrical machine characteristics of the power supply units are therefore easily adjusted. Since the capacity of the welding machine or cutting machine can be varied later merely by increasing or decreasing the number of power supply units, the initial outlay for equipment is facilitated, a failure occurring in a portion of the power supply units can be addressed merely by replacing a unit, and a plasma arc power supply can be obtained that is more stable and environmentally friendly than the conventional technique.

In the present embodiment, an example was described in which the relay circuit 7 predicts the timing at which the power supply unit U1 reaches the rated current, and the relay circuit 7 outputs a relay signal for controlling the drive initiation timing of the power supply units U2 through U4. However, a configuration may also be adopted in which the driving of the power supply units U2 through U4 is delayed in advance by the relay signal, the coincidence of the current I1 of the power supply unit U1 with $I_{MAX}$ is detected, and driving of the power supply units U2 through U4 is initiated.

The current I1 outputted by the power supply unit U1 after t9 may be the same as or different from the currents I2, I3, I4 outputted by the other power supply units U2 through U4, respectively.

The time at which feeding of the currents I2 through I4 of the power supply units U2 through U4 was initiated was described as the moment that the current I1 of the power supply unit U1 reaches the maximum value, but this initiation time may also be the approximate time at which the I1 reaches the maximum value. However, the time at which feeding of the currents distributed to the direct-current power supply units U2 through U4 is initiated is preferably at or after the time at which the current fed to the direct-current power supply unit U1 reaches 70% or more of the maximum value.

2. Embodiment 2

Figure 4:
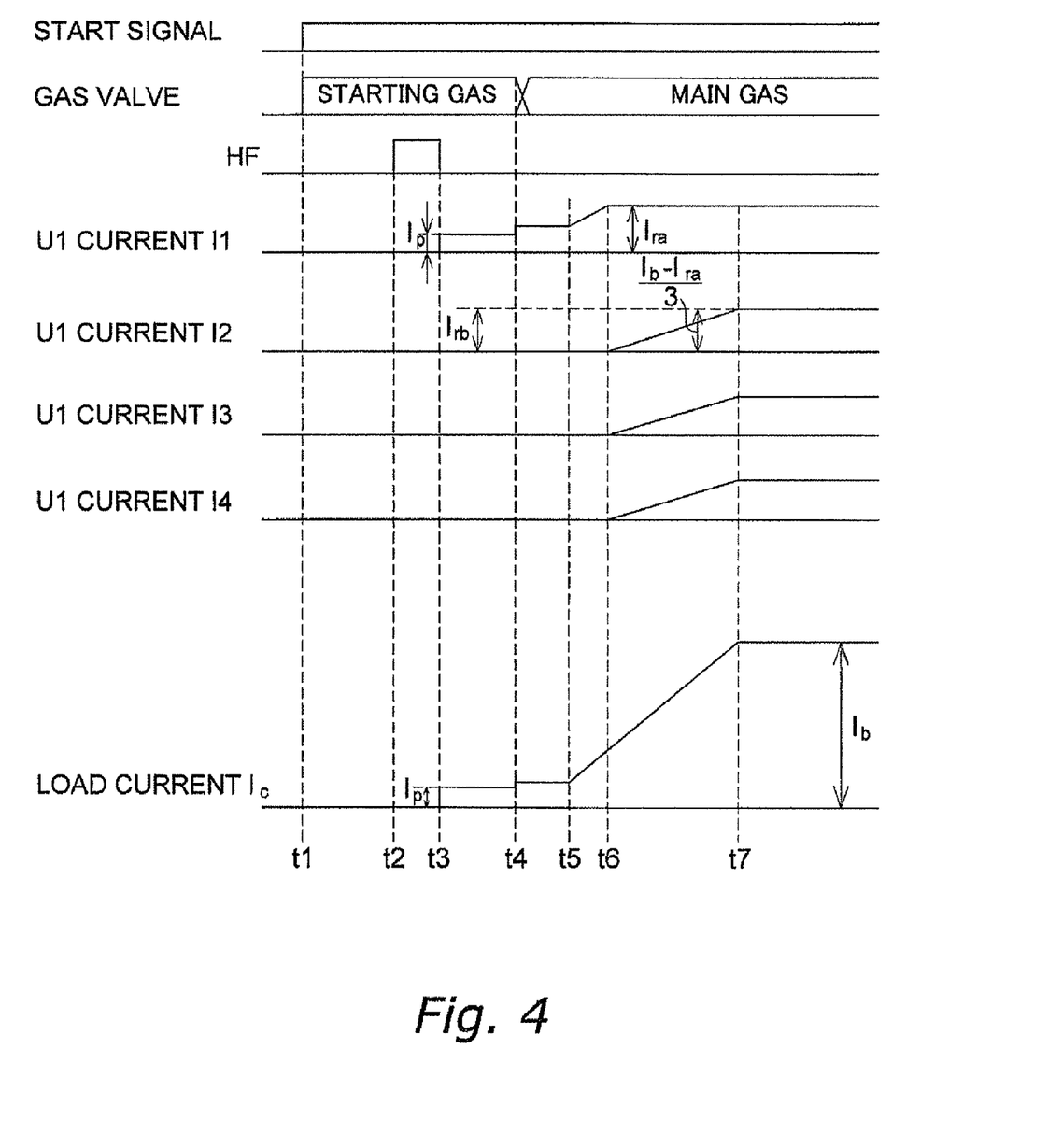
FIG. 4 is a timing chart showing the control operations of Embodiment 2.

An example was described in the aforementioned embodiment in which driving of the remaining power supply units U2 through U4 was initiated when the power supply unit U1 reached the rated current, but a configuration may also be adopted in which driving of the remaining power supply units U2 through U4 is initiated when the current from the power supply unit U1 reaches 80%, for example, of the rated current, as shown in FIG. 4. The load current $I_b$ in this case is smaller than the load current $I_b$ of the aforementioned embodiment.

Specifically, the target value of the current I1 of the power supply unit U1 is $I_{ra}$ (e.g., 80 A), which is lower than the rated current $I_{MAX}$, and the target value $I_{rb}$ of the currents I2 through I4 of the power supply units U2 through U4 is $(I_b-I_{ra})/3$. Through the relay signal from the relay circuit 7, the current of the power supply unit 1 begins to increase at t5 in the same manner described above after the current stabilizes, the power supply units U2 through U4 are driven to increase the currents I2 through I4 at the timing t6 at which the current of the power supply unit U1 reaches the current $I_{ra}$, which is lower than the rated current, and the current is maintained when the current reaches $(I_b-I_{ra})/3$.

Since the power supply units are not used at the rated current, the service life of the power supply units increases.

The time at which feeding of the currents I2 through I4 of the power supply units U2 through U4 was initiated was described as the moment that the current $I_{ra}$ of the power supply unit U1 is reached, but this initiation time may also be the approximate time at which the $I_{ra}$ is reached.

The current I1 outputted by the power supply unit U1 after t7 may be the same as or different from the currents I2, I3, I4 outputted by the other power supply units U2 through U4, respectively.

A case in which an even larger load current $I_d$ is required after the load current $I_b$ is already obtained will next be described using FIG. 5. When the load current $I_d$ is specified at t8, the currents of all the power supply units U1 through U4 are increased. At this time, the signal distributor 6 divides the load current $I_b$ into N parts, i.e., 4 equal parts, so that the currents I1 through I4 generated by the power supply units U1 through U4 from t8 to t9 all have the same value. The power supply unit U1 is increased to the rated current $I_{MAX}$ of 100 A, for example, at t9, and a current equal to the rated current $I_{MAX}$ is then handled. The currents generated by the power supply units U2 through U4 are $(I_d-I_{MAX})/3$.

The current I1 outputted by the power supply unit U1 after t9 may be the same as or different from the currents I2, I3, I4 outputted by the other power supply units U2 through U4, respectively.

An example was described in which the power supply unit U1 reaches the rated current at the same time as the other power supply units U2 through U4, but a configuration may be adopted in which the currents generated by the power supply units U1 through U4 are distributed by the signal distributor 6 so as to increase the currents of the power supply units U1 through U4 so that the power supply unit U1 reaches the rated current sooner than the other power supply units U2 through U4.

A configuration may also be adopted in which the power supply units U2 through U4 reach the rated current sooner than the power supply unit U1.

3. Effect of the Present Invention

The current increases and decreases also when, for example, the gas is exchanged at t4 in FIG. 3 in the unstable state in the small-current region immediately after the plasma arc is generated. However, since the current immediately after generation of the plasma arc is handled solely by one power supply unit as in the present example, there is no synthesis of the upward and downward variation of the plurality of currents, and a transition to the main arc can be made in a stable state. Furthermore, since the load current $I_b$ is continuously fed by a single power supply unit in the small-current region of approximately 80 to 100 A or less, energy loss is minimal, and a stable power supply can be obtained.

Since the remaining plurality of power supply units can also be driven in gradually increasing fashion after the current has sufficiently increased, overshoot that occurs during startup of the (N−1) direct-current power supply units can be prevented, and welding or cutting can be performed satisfactorily.

4. Modified Examples of the Present Invention

The rated current of the power supply units is not necessarily 100 A, and the value of 100 A is not limiting.

An example was described in which the number N of power supply units was four, but any number of power supply units may be provided according to the application.

The embodiments described above may be used independently, or various elements thereof may be combined.

The present invention may be applied in any type of power supply insofar as the power supply is a welding machine or cutting machine power supply in which a plurality of feedback-controlled direct-current power supplies are used to control the load current so as to be constant.

The plasma arc power supply control method of the present invention may also be implemented by hardware, software, or any combination thereof. The control method in particular can be implemented as a program, and the program can be recorded in various types of recording media.

The descriptions given above are only examples of the implementation of the present invention, and in no way limit the present invention.

The present invention makes it possible to obtain a stable plasma arc power supply having minimal energy waste in the small-current region by using N power supply units having the same structure to control the drive timing of one power supply unit and the remaining (N−1) power supply units, and therefore has adequate industrial applicability.

This application claims priority to Japanese Patent Application No. 2006-338421. The entire disclosure of Japanese Patent Application No. 2006-338421 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A plasma arc power supply comprising:
output setting means for specifying an output of a variable load current;
N (N≧2) direct-current power supply units that are feedback-controlled by a detection signal of a corresponding output current;
a relay circuit for outputting a relay signal for delaying a drive timing of (N−1) direct-current power supply units among said N direct-current power supply units; and
a signal distributor for distributing said load current and determining a current value generated by said N direct-current power supply units;
wherein
one direct-current power supply unit among said N direct-current power supply units outputs a pilot arc current;
only said one direct-current power supply unit continuously supplies a load current in a small-current region;
said relay circuit drives only said one direct-current power supply unit and increases the load current to a prescribed current value when a load current that exceeds the small-current region is specified by said output setting means; and
said relay circuit outputs a relay signal so that said (N−1) direct-current power supply units are driven, and said N direct-current power supply units generate a current on the basis of the current value determined by said signal distributor when the current value of said one direct-current power supply unit reaches said prescribed current value, resulting in a composite output of said N direct-current power supply units coinciding with said load current.

2. The plasma arc power supply according to claim 1, wherein said signal distributor distributes 1/N of said specified load current that exceeds said small-current region.

3. The plasma arc power supply according to claim 1, wherein
said signal distributor divides said load current into a first current and a second current, and divides said second current into 1/(N−1); and
said first current is generated by said one direct-current power supply unit, and 1/(N−1) of said second current is generated by each of said (N−1) direct-current power supply units.

4. The plasma arc power supply according to claim 1, wherein said small-current region is 100 A or less.

5. The plasma arc power supply according to claim 1, wherein a current distributed among said (N−1) direct-current power supply units gradually increases in a feeding initiation period.

6. The plasma arc power supply according to claim 1, wherein the feeding initiation period of the current distributed among said (N−1) direct-current power supply units is a period beginning when a current fed to said one direct-current power supply unit is 70% or more of a maximum value.

7. The plasma arc power supply according to claim 1, wherein said load current is fed by only said one direct-current power supply unit if a load current that exceeds the small-current region is not specified.

8. A control method for a plasma arc power supply provided with N (N≧2) direct-current power supply units that are feedback-controlled by a detection signal of an output current; said control method comprising:
causing one direct-current power supply unit among said N direct-current power supply units to output a pilot arc current;
causing only said one direct-current power supply unit to supply a load current subsequently in a small-current region;
determining whether or not a load current that exceeds the small-current region has been specified;
causing said one direct-current power supply unit to supply the load current while increasing the load current if a determination is made that a load current that exceeds said small-current region has been specified;
determining whether or not the current value of said one direct-current power supply unit has reached a prescribed current value; and
driving said (N−1) direct-current power supply units, generating a current that is distributed among said N direct-current power supply units, and causing a composite output of said N direct-current power supply units to coincide with said load current if a determination is made that a current value of said one direct-current power supply unit has reached said prescribed current value.

9. The control method for a plasma arc power supply according to claim 8, wherein 1/N of said load current is allocated to said N direct-current power supply units when driving said (N−1) direct-current power supply units.

10. The control method for a plasma arc power supply according to claim 8, wherein
said load current is divided into a first current and a second current, and said second current is divided into 1/(N−1) when driving said (N−1) direct-current power supply units; and
said first current is generated by said one direct-current power supply unit, and 1/(N−1) of said second current is generated by each of said (N−1) direct-current power supply units.

11. The control method for a plasma arc power supply according to claim 8, wherein said small-current region is 100 A or less.

12. The control method for a plasma arc power supply according to claim 8, wherein a current distributed among said (N−1) direct-current power supply units gradually increases in a feeding initiation period when driving said (N−1) direct-current power supply units.

13. The control method for a plasma arc power supply according to claim 8, wherein the feeding initiation period of the current distributed among said (N−1) direct-current power supply units is a period beginning when a current fed to said one direct-current power supply unit is 70% or more of a maximum value when driving said (N−1) direct-current power supply units.

14. The control method for a plasma arc power supply according to claim 8, further comprising feeding said load current by only said one direct-current power supply unit when a determination is made that a load current that exceeds the small-current region is not specified when determining whether or not a load current that exceeds the small-current region has been specified.

15. The control method for a plasma arc power supply according to claim 9, wherein said small-current region is 100 A or less.

16. The control method for a plasma arc power supply according to claim 10, wherein said small-current region is 100 A or less.

17. The control method for a plasma arc power supply according to claim 9, wherein a current distributed among said (N−1) direct-current power supply units gradually increases in a feeding initiation period when driving said (N−1) direct-current power supply units.

18. The control method for a plasma arc power supply according to claim 10, wherein a current distributed among said (N−1) direct-current power supply units gradually increases in a feeding initiation period when driving said (N−1) direct-current power supply units.

19. The control method for a plasma arc power supply according to claim 11, wherein a current distributed among said (N−1) direct-current power supply units gradually increases in a feeding initiation period when driving said (N−1) direct-current power supply units.

* * * * *